United States Patent [19]
Wical et al.

[11] Patent Number: 6,101,515
[45] Date of Patent: *Aug. 8, 2000

[54] LEARNING SYSTEM FOR CLASSIFICATION OF TERMINOLOGY

[75] Inventors: Kelly Wical, San Carlos; James Conklin, Scotts Valley, both of Calif.

[73] Assignee: Oracle Corporation, Redwood Shores, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/655,957

[22] Filed: May 31, 1996

[51] Int. Cl.⁷ ..................................................... G06F 15/00
[52] U.S. Cl. .......................... 707/531; 707/907; 382/227
[58] Field of Search ..................................... 707/500, 530, 707/531, 532, 204, 1, 2, 3, 4, 5, 101, 907; 706/12, 46, 934; 382/159, 155, 224, 225, 226, 227

[56] References Cited

U.S. PATENT DOCUMENTS

| | | | |
|---|---|---|---|
| 5,153,831 | 10/1992 | Yianilos | 707/531 |
| 5,159,667 | 10/1992 | Borrey et al. | 395/148 |
| 5,257,185 | 10/1993 | Farley et al. | 365/419.19 |
| 5,619,709 | 4/1997 | Caid et al. | 707/532 |
| 5,625,767 | 4/1997 | Bartell et al. | 395/140 |
| 5,680,511 | 10/1997 | Baker et al. | 704/257 |
| 5,694,523 | 12/1997 | Wical | 706/45 |
| 5,708,822 | 1/1998 | Wical | 707/531 |
| 5,768,580 | 6/1998 | Wical et al. | 707/531 |

*Primary Examiner*—Amelia Au
*Assistant Examiner*—Jingge Wu
*Attorney, Agent, or Firm*—Stattler Johansen & Adeli, LLP

[57] ABSTRACT

A learning system learns terms in the context of a set of documents. During an accumulation phase, the learning system accumulates contextual data for a term in the form of a categorization schema. The categorization schema, which is based on a classification hierarchy, classifies the term in categories such that the classifications are based on uses of the terms in the set of documents. During a computational phase, the learning system analyzes the categorization schema, and selects, if sufficient contextual data has been accumulated, a single category in the classification system to classify the term. A content processing system, which understands the thematic content of documents, is used in conjunction with the learning system.

28 Claims, 10 Drawing Sheets

300

LEARNING SYSTEM FOR CLASSIFICATION OF TERMINOLOGY

COPYRIGHT NOTICE

Appendix A contains material which is subject to copyright protection. The copyright owner has no objection to the facsimile reproduction of this material as it appears in the United States Patent and Trademark patent files or records, but otherwise reserves all copyright rights whatsoever.

BACKGROUND OF THE INVENTION

1. Field of the Invention

The present invention is directed toward the field of computational linguistics, and more particularly to an automated terminology learning and classification system.

2. Art Background

In general, automated terminology learning/classification systems attempt to understand terminology input from one or more documents. One goal of learning systems is to learn terminology in documents so that when the terminology is encountered in a subsequent document, the meaning of the term is understood. Another goal of learning systems is to use learned terminology for query operations in a search and retrieval system. For the query application, if the meaning of a term is understood or learned, then documents, which include similar themes but expressed using different terminology, may be retrieved.

Typically, the attempt to understand the meaning of terminology from documents is not done in conjunction with an external reference that provides a definition or classification for the term A general definition or classification for a term may be defined as a lexical association Instead of using a lexical association, the prior art learning systems attempt to learn terminology from a document as it is associated with other terms used in the same document. The association of a term to other terms is not truly defining or associating the term to a definition, but merely identifying semantic associations. For example, a semantic association of the term restaurant may yield terms such as menu, chef, seafood, etc. However, a lexical meaning or definition of the term restaurant may yield the term dining establishments, or the like. The association of terminology with other terms in the same document to learn the meaning of the term is limited in terms of the usefulness and application of these prior art learning systems. Thus, it is desirable to develop a learning system that learns terminology, not by statistical association, but through use of independent criteria, such as generating lexical associations.

Typically, prior art learning systems implement a sequential approach to learning. For this approach, the learning systems attempt to learn a term on a document by document basis. For example, a learning system may associate a term with other terms used in a document to understand the meaning of that term. If the term is encountered in a subsequent document, the learning system may attempt to change or modify the previous understanding (e.g. modify the association of the term) This sequential approach tends to lead to a substantially inaccurate understanding of the term. Although a decision to learn a term based on input from a single document may appear correct based on that document, a series of these isolated decisions ultimately leads to a diversion in determining the true meaning of the term. Thus, with the sequential method, the prior art learning systems get on the wrong track in terms of understanding terminology. Therefore, it is desirable to develop a learning system that does not use a sequential approach to learning terminology.

SUMMARY OF THE INVENTION

The learning system learns words and phrases (e.g. terminology) in the context of a set of documents. During an accumulation phase, the learning system accumulates contextual data from the set of documents for the term. In general, the contextual data specifies lexical classifications of documents in which the term appears based on the uses of other terms in the document set. In a subsequent computational phase, the learning system analyzes the contextual classification data to select, if the term is unambiguous, a single general classification for the term. The learning system, through accumulating contextual data from the set of documents prior to analyzing, uses a wholeness approach to learning.

In one embodiment, the learning system is used in conjunction with a classification system. The classification system, known as a knowledge catalog, includes categories arranged in a hierarchical structure. The categories in the knowledge catalog reflect lexical relationships among parent and child categories. For this embodiment, the learning system, to accumulate the contextual data, classifies the term in the categories, wherein the classifications are based on uses of the terms in the set of documents. The learning system analyzes the contextual data, and selects a single category, or multiple if ambiguous, in the classification system to classify the term. Thus, the learning system generates lexical associations to learn terminology.

In one embodiment, the learning system is used in conjunction with a content processing system. The content processing system analyzes the set of documents to identify themes for each document. The content processing system, which understands the thematic content of the documents, classifies terms from a document based on the context of the term in a document.

In one embodiment, the learning system, during the accumulation phase, generates a lexical categorization schema based on the knowledge catalog The categorization schema includes nodes of the knowledge catalog. The nodes correspond to the categories of the classification hierarchy that were classified for the terms in the accumulation phase. The contextual data specifies the number of documents that were classified to each node and a classification strength indicating the strength of the corresponding classification. The learning system analyzes the categorization schema to select the best node for the term. The learning system, in an attempt to specifically define the term, selects a node in the lowest level of the classification hierarchy supported by the contextual data.

DETAILED DESCRIPTION OF THE PREFERRED EMBODIMENTS

Figure 1A:
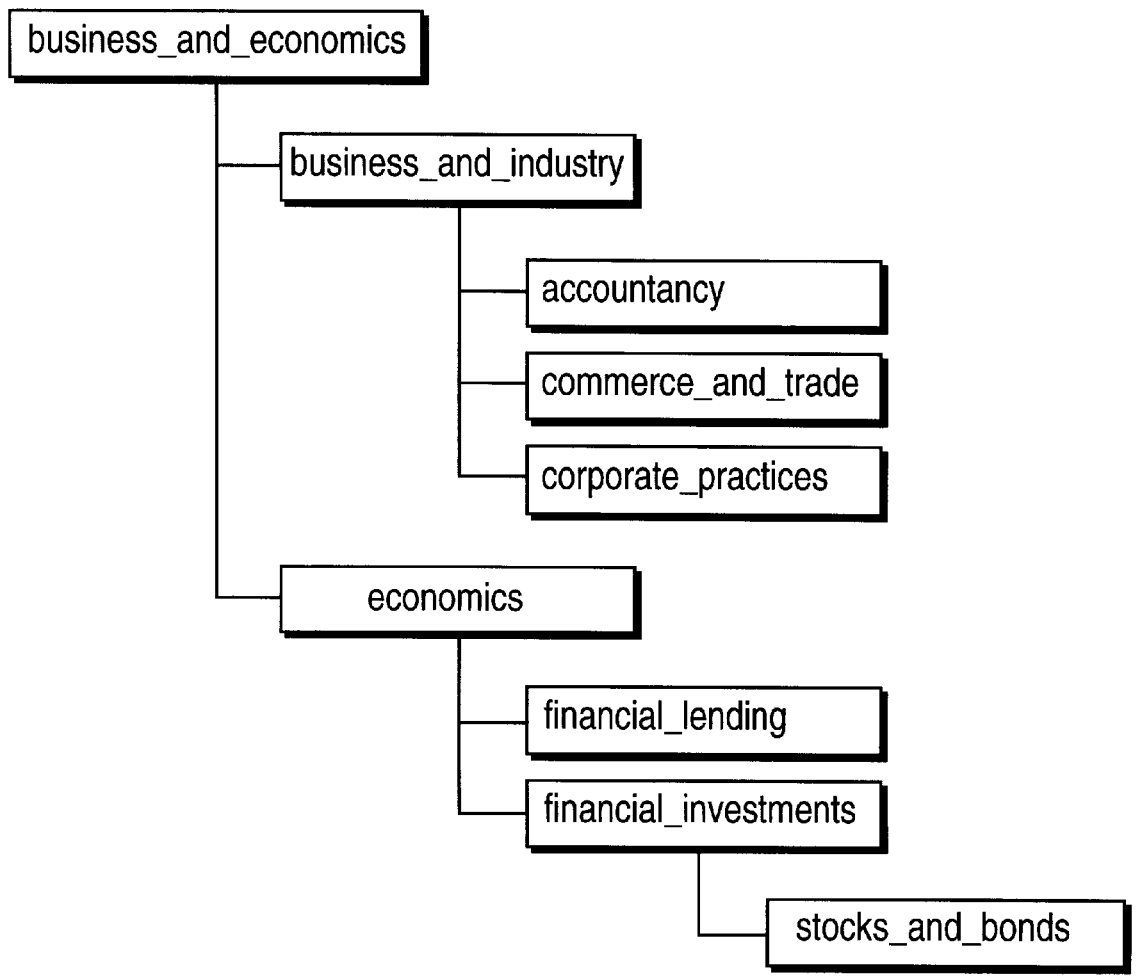
FIG. 1a illustrates a first portion of a classification tree structure that includes categories for "business and economics."

Learning System Overview:

In general, the learning system of the present invention provides an automated means for learning words and phrases (e.g. terminology) in the context of a set of documents. The document set may contain documents on one or more subjects. In one embodiment, the learning system learns the terminology from a specified set of documents by classifying the terms in categories of a classification system. Although the present invention is described in conjunction with a learning system that associates terms to categories of a classification system, the present invention applies to any learning system that attempts to learn or define terminology. As is described more fully below, the world view classification system, referred to as a knowledge catalog, contains categories that define knowledge to classify information. The categories are arranged in a hierarchical structure that includes a plurality of levels. The knowledge catalog for use in the learning system is described more fully below. Although the learning system of the present invention is described in conjunction with a classification system that provides a world view of knowledge (e.g. the knowledge catalog), any classification system may be used with the learning system without deviating from the spirit and scope of the invention.

In general, the learning system of the present invention utilizes all the documents in a document set simultaneously as a universe of discourse. Thus, the learning system learns document terminology within the context of the documents. Even within the document set, the learning system selects, depending upon the quantity and quality of data available, certain terminology for learning. For example, to fully understand the meaning of a term, the learning system may require the use of the term in a minimum number of documents or the use of the term a minimum number of times. In addition, the learning system uses a wholeness approach to learning. In the wholeness approach to learning, the learning system considers all documents that use a particular term prior to learning that term (e.g. prior to classifying the term in a category). In contrast, the prior art sequential approach to learning, discussed in the background above, learns terms on a document by document basis. Thus, the learning system learns terminology relative to an entire set of documents (e.g. decisions about the meaning of a term are not formulated from a single use of that term).

To learn words and phrases (e.g. terms), the learning system locates the proper category in the classification system. To locate a category at any level of the classification hierarchy, the learning system first identifies a general category for the term (e.g. "science and technology" or "business and economics"). However, when discerning among high level categories, some terms may have more than one meaning (e.g. the term by itself is ambiguous). For example, the term "bank" has more than one meaning, and therefore the term "bank" is ambiguous by itself. The term "bank" may connote a financial institution, an airplane maneuver, or an area adjacent to a river. If the document set contains themes about financial institutions, then the learning system looks to classify the term "bank" under the high level category of "business and economics", and more specifically to classify the term under the category "economics and financial institutions." For a different set of documents about airplanes, the term "bank" may be categorized under the high level category of "transportation", or more specifically the term may be categorized under the category "aircraft" (e.g. the term "bank" is learned in the context of an aircraft maneuver). In a third set of documents about rivers, the term "bank" is learned by the learning system as a bank along a river. A fourth set of documents may be about financing the purchase of land near a river bank. For the fourth set of documents, the term "bank" may be used in two different connotations (e.g. a bank as the financial institution that financed the purchase, and the river bank as the subject of the land purchase). Therefore, because the term "bank" has two different connotations in the fourth set of documents, the term, in this context, is ambiguous. Thus, as shown by the above examples, a term, although ambiguous without a particular context, may be learned depending upon the particular document set. Accordingly, the learning system identifies the proper category to classify the terminology within the context of a document set.

In addition to identifying the proper high level category to learn a term, the learning system determines the proper level of the hierarchy under the high level category to classify the term. In general, the learning system pushes down to the lowest level category in the classification system to properly classify the input terminology. Thus, the learning system does not classify terms at too high of a level in the classification hierarchy. As illustrated by the following example, some input terms require classification at an intermediate level such that pushing the classification to a low level category results in an improper classification for the term Thus, the learning system does not classify terms at too low of a level in the classification hierarchy so the term is not defined too narrowly. As is described more fully below, the learning system includes processes that balance the proper level of classification in the classification hierarchy.

FIG. 1a illustrates a first portion of a classification hierarchy that includes categories for "business and economics." For this example, the parent category "business and economics" includes the child categories "business and industry" and "economics." Furthermore, the "economics" category includes the child categories "financial lending" and "financial investments." Also, the financial investments category includes a child category "stocks and bonds."

For an example input term, "short-term", the learning system attempts to select a category that best defines the use of the term in the document set. For this example, the document set is generally about short-term financial instruments, including short-term loans and short-term investments, such as stocks and bonds. To learn the term, the learning system may select the high level category "business and economics" as the learned category for the input term "short-term." Although the document set includes themes about "business and economics" generally (e.g. short-term financial investments), the input term "short-term" may be more specifically defined. Thus, if categorized in the "business and economics" category, the term "short-term" would be learned at too high of a level (e.g. the associated meaning of the "business and economics" category is too broad for the term "short-term" used in the context of the document set).

For the example document set, the learning system may also select the category "stocks and bonds" as the learned category for the input term "short-term." However, if the learning system selects the category "stocks and bonds" as the learned category for the input term "short-term", then the associated meaning of the category "stocks and bonds" is too narrow because "short-term" may also apply to the parent categories "financial investments" and "financial lending." Thus, classification for the example phrase short-term in the "stocks and bonds" category results in an associated meaning too specific to properly define the term. Also, if the learning system selects either the category "financial lending" or the category "financial investments", the term "short-term", as used in the document set, falls within the meaning of both financial lending or financial investments. Therefore, categorization in one of these categories is to the exclusion of the other, thereby resulting in too narrow of a classification. The learning system classifies the term "short-term" in the "economics" category, an intermediate level category in the classification hierarchy, to select the category best associated with the term. Therefore, as shown by this example, the association of terms with categories includes not only selecting the general area of the classification hierarchy that best associates the term, but also requires selecting the category that represents the proper level of detail within this general area.

Figure 1B:
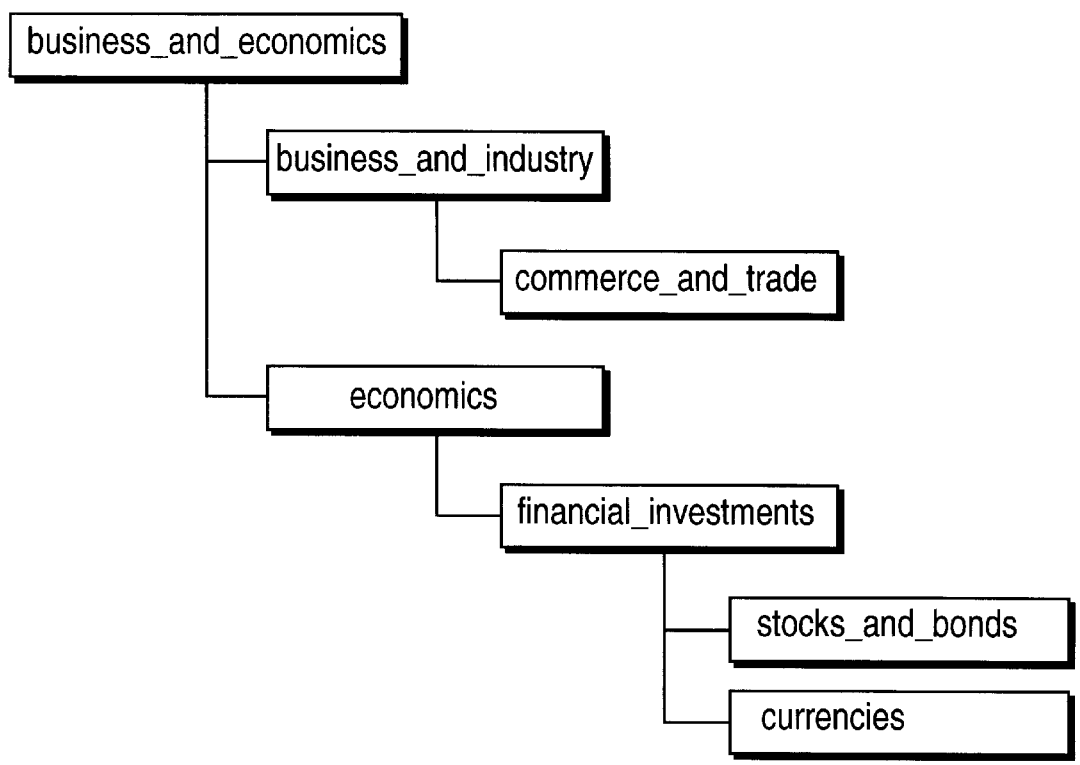
FIG. 1b includes a second portion of a classification hierarchy that includes categories for "business and economics."

FIG. 1b includes a second portion of a classification hierarchy that includes categories for "business and economics." For this example classification hierarchy, the high level category "business and economics" includes, on one branch, the child category "economics." Also on that branch, the category "economics" includes the child category "financial investments", and the category "financial investments" includes the child categories "stocks and bonds" and "currencies." If the learning system receives the term "Eurodollar bonds" to learn, the learning system selects the category "stocks and bonds" to best categorize the term "Eurodollar bonds." For this example, the category "stocks and bonds" provides the proper level of classification because the input term, "Eurodollar bonds", is a specific type of bond. Although the term "Eurodollar bonds" is a financial investment, the category "financial investments" provides too broad of a meaning for the term. Thus, as illustrated by the above examples, the learning system, once locating the proper high level category area, selects the proper level of detail to best classify and learn the input terminology The learning system, when used in conjunction with a document set, utilizes a wholeness approach for learning terminology For this embodiment, the learning system accumulates contextual data from a document set about the use of each term in the document set. For example, a learning system, which uses a classification system to associate terms, accumulates contextual data that includes a plurality of categories from the classification system, wherein each category defines the use of the term in a document. After the accumulation phase, the contextual data includes a plurality of definitions for the different uses of the term in the document set. For the wholeness approach, the learning system, to learn a term, analyzes all of the contextual data before selecting a single definition or category. The wholeness approach (e.g. analyzing all contextual data accumulated before learning) permits accurate classification of terminology in the learning system.

The learning system requires the use of a minimum amount of data to properly learn a term. The minimum amount of data may be obtained from a document set that includes several uses of the term For example, if a term is used only once in a document set, then the learning system, rather than improperly classifying the term, may not classify the term at all due to the limited amount of data (e.g. insufficient contextual data). An effective text processing system that fully extracts the thematic content of discourse, such as the content processing system described below, may be used in conjunction with a learning system to learn terms with a very small amount of contextual data. However, a robust text processing system, such as the content processing system described below, more effectively learns terminology with more contextual data.

The learning system, when activated, continually updates, modifies and augments the categorization of terminology contained in the document set. For example, a learning system may be configured to learn all of the important terms in a document set. For this configuration, the learning system may learn ten terms with a first set of four documents. However, with an additional ten documents added to the first set of documents, the learning system may identify one hundred terms as learned valid terms. For this example, the additional documents added to the first set of documents provided the required context and use of terms to validate the additional learned terms.

The wholeness approach to learning, which involves considering all contextual data accumulated about a term before learning the term, not only identifies the proper category but also brings to light categories that improperly define the term. Thus, considering all contextual data accumulated not only indicates the proper category for a term, but it also identifies what the term is not. For example, if a term is used in a single document, the contextual data accumulated for the term in the single document may indicate categorization in a first category. However, as more data is collected, which reflects the use of the term in more documents, the data may strongly indicate categorization in a second category, remote from the first category. Typically, as more data is collected about a term, the term manifests itself in a general area in the classification hierarchy. Thus, for this example, if the term was categorized through use of only the one document, which indicated categorization in the first category, then the term would have been improperly categorized because the proper categories did not yet manifest themselves. Accordingly, the wholeness approach to learning permits understandings of both what the term defines and what the term doesn't define.

In one application, the learning system classifies terminology under a category so that when a new document or textual input is processed, the text processing system understands the meaning of the terminology in the context of the document set. In current systems, lexicographers manually classify terminology so that words may be learned for use in document classification. However, the automated learning system of the present invention provides much greater efficiency due to the hardship of manually learning hundreds of thousands or even millions of terms. Thus, as more documents are entered into the system, the learning system continually learns, and modifies if necessary, the general categorization of terminology to understand the meaning of that terminology within the context of the document set. For example, the name of a wine maker or vintner, a proper noun, may be used in documents about the wine industry. The general meaning of the vintner name may not be known because it is not defined in a lexicon or dictionary. As the general meaning of the vintner name is learned from a first set of documents about the wine industry, the learned name of the vintner may be used to further categorize additional documents about the wine industry (e.g. documents added to the first set of documents about the wine industry).

Accordingly, the learning system may be used to continually improve a classification system through use of learned terminology.

In one embodiment, the learning system learns common nouns and proper nouns. In general, a phrase is a more valuable input to the learning system to learn than a word because phrases are typically unambiguous, and thus are easier to learn. Criteria for identifying appropriate phrases to learn is described more fully below. The learning system may be configured to generate learned terminology that conveys the most important terms identified in the document set. For example, the most important terms in the document may be the content carrying terms most used in the document. In general, the content carrying terms are the technical and industry words and phrases that convey the thematic information of the documents. Typically, the learning system identifies for learning common nouns and proper nouns. However, the learning system of the present invention may identify any word or phrase for learning. In one embodiment, a text processing system identifies terms that specify the main themes of the documents, as well as terms indexed for those documents. The themes and the indexed terms are those terms learned by the learning system.

Figure 2:
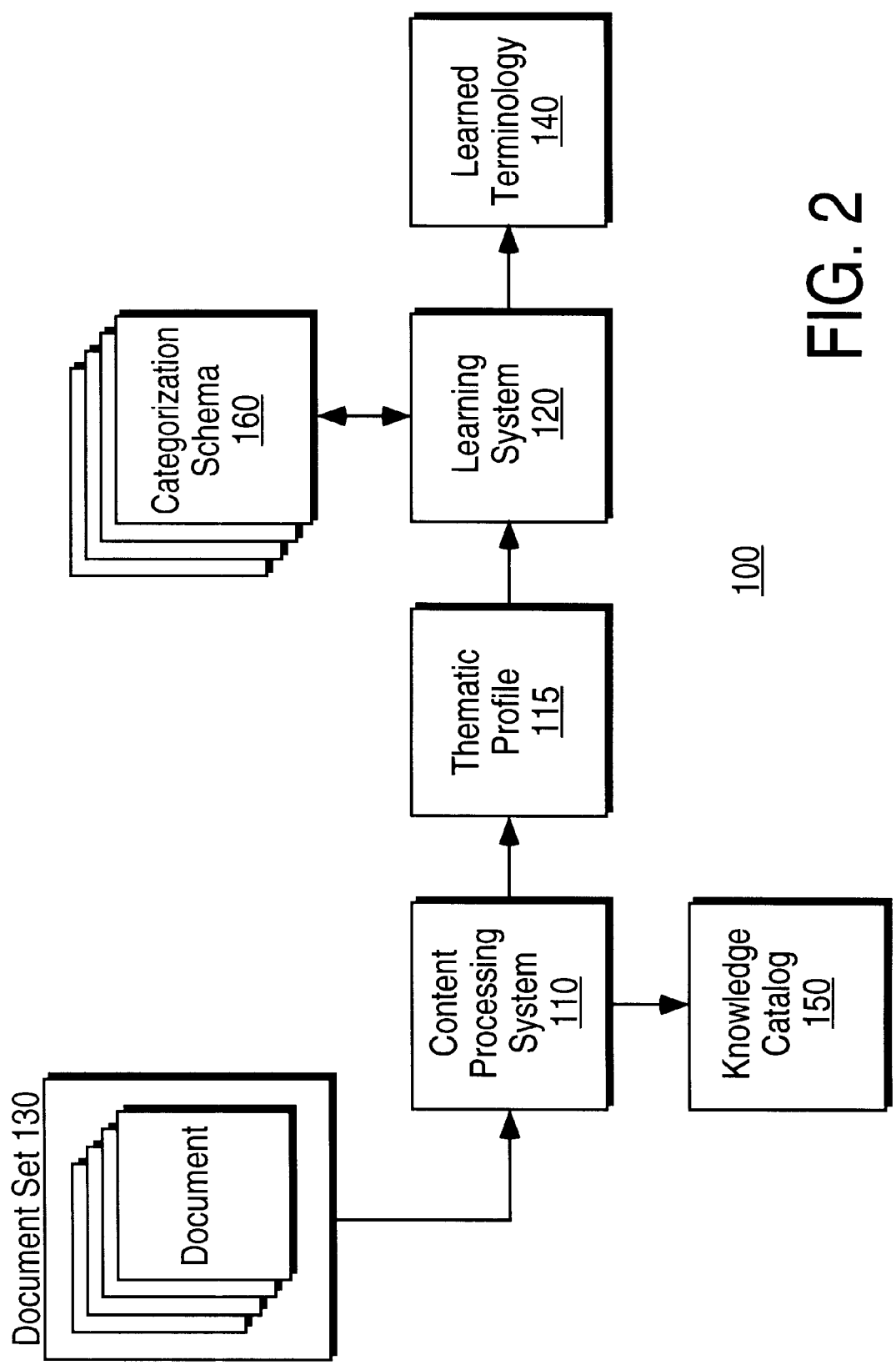
FIG. 2 is a block diagram of a text processing system that utilizes the learning system of the present invention.

FIG. 2 is a block diagram of a text processing system that utilizes the learning system of the present invention. A text processing system 100 includes a content processing system 110, a learning system 120, and a knowledge catalog 150. In general, the text processing system 100 receives a document set 130, and in turn, it learns terminology in the document set 130 based on the use of the terminology in individual documents in the document set 130. The terminology (e.g. words and phrases) learned are shown as the learned terminology block 140 in FIG. 2. In one embodiment, document set 130 includes discourse on one or more topics. The document set 130 may include speech or textual input.

The knowledge catalog 150, used to classify terms for learning, provides a unique infrastructure to accurately represent categories that define knowledge. The knowledge catalog includes a set of static ontologies to define knowledge. The knowledge catalog may be characterized as including several static ontologies because the knowledge catalog provides multiple views, characterizations, and organizations of concepts or categories. The static ontologies are parallel and independent of each other. The actual configuration, structure and orientation of a particular ontology is dependent upon the subject matter or field of the ontology. Therefore, each ontology in the set of static ontologies contains a different point of view. The different points of view for the static ontologies result in different approaches or different ways of viewing the knowledge concepts in the different static ontologies. Consequently, the organization of the knowledge concepts in each ontology is not consistent.

The ontologies contained within the knowledge catalog are organized such that the concepts are independent of language and culture. Some of the ontologies are not as much industries but rather concrete concepts. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

Some static ontologies represent knowledge concepts that have concrete definitions, but may be applicable to one or more specific industries or categories (e.g. the terms are generic). For example, the word "plant", when used to describe a manufacturing plant, is a concrete term that applies to many industries. Other static ontologies contain representations of words that are not concrete, but rather describe abstract concepts. For example, the concepts of "knowledge" and "methods" do not describe material items, but are "abstract" concepts. The knowledge catalog 150 includes categories arranged beneath high level categories, in an up/down direction, as well as categories arranged on the same level of the hierarchy, in a right/left direction. For example, as shown in FIG. 1a, the categories "business and industry" and "economics" are located under the parent category "business and economics" because the "business and industry" and "economics" categories are more detailed concepts that relate semantically to the parent category "business and economics." Also, categories located on the same level of the hierarchy are categories that represent concepts in a similar level of detail in relationship to a parent category. For example, the categories "business and industry" and "economics" have a similar relationship to the parent category "business and economics."

The categories in the knowledge catalog may be semantic derivatives and/or lexical derivatives of the parent category. For example, a branch of the classification hierarchy may associate a "house" with articles placed within a house, such as dining room tables, chairs, bedroom furniture, etc. For this example, a classification hierarchy that includes semantic derivative concepts based on the "house" concept is desirable However, for a purely lexical classification hierarchy, the house "concept" may include types of houses, such as a ranch style house, a contemporary house, etc. A categorization schema, which is based on the categories in the knowledge catalog, includes both the semantic and lexical classifications. For the above example of a "house" parent category, a categorization schema may include sub-categories that represents articles placed within a house as well as sub-categories that represent types of houses. Consequently, the knowledge catalog presents a true knowledge map of the documents. Although the learning system uses a classification hierarchy arranged semantically/lexically, any classification hierarchy may be used without deviating from the spirit and scope of the invention. A hierarchical arrangement of categories in accordance with one embodiment for a knowledge catalog is shown in Appendix A.

In general, the content processing system 110 analyzes the document set 130. As shown in FIG. 2, the content processing system 110 generates a thematic profile 115 to describe the content of the document set. The thematic profile 115 contains contextual data, for each term, to indicate the use of terminology in the document set 130. The learning system, during an accumulation phase, compiles contextual data for a term through use of the thematic profile 115. For purposes of explanation, the contextual data is expressed as a categorization schema, labeled block 160 on FIG. 2. In one embodiment, to generate the contextual data, the content processing system 110 generates, in part, a plurality of themes, including the most important themes, for each document in the document set 130. The themes identify the content of the individual documents. In addition to identifying themes, the content processing system 110 identifies a plurality of content carrying words and phrases in the form of indexes. The content carrying words and phrases also contribute to the overall meaning or content of the document set 130. To generate contextual data, the content processing system 110 analyzes the themes and the content carrying words to classify each theme and content carrying word from a document in the knowledge catalog 150 based on the use in the respective document. The content processing system 110 may associate more than one category for a single word or phrase from a single document, depending upon the use of the word or phrase in the document. Thus; the learning system 120 generates, through use of the thematic profile 115, a categorization schema 160 for each term to be learned by the learning system 120. An example content processing system for use with the learning system of the present invention is described more fully below in the section entitled "A Content Processing System."

The Accumulation Phase:

In general, the categorization schema 160 includes portions of the hierarchical categories in the knowledge catalog 150, and provides a link between terms of the documents and categories in the knowledge catalog. Specifically, the categorization schema for a term contains the categories classified for that term in the documents of the document set. For purposes of nomenclature, categories in the categorization schema, which are classified for a term, are called nodes. In one embodiment, the content processing system 110 generates data about the quality and quantity of the nodes, and their parent categories, classified in the categorization schema 160. Specifically, the content processing system 110 specifies, for each node classified in the categorization schema 160, the number of documents classified for the term in the respective node, and a classification strength for the node. An example categorization schema of a term for learning in the learning system is described more fully below.

The learning system utilizes the categorization schema for a term to learn the term In one embodiment, the learning system 120 receives user input that specifies, in part, terms for learning. In response, the learning system 120, utilizing the categorization schema for each term, specifies a category to reflect the general meaning of the term.

In one embodiment, the categories of the knowledge catalog are arranged semantically and lexically such that the distance between the categories in the knowledge catalog reflect a general semantic/lexical relationship among the categories. In general, the categories located at the top of the knowledge catalog hierarchy have a greater semantic/lexical distance than the categories located near the bottom of the knowledge catalog hierarchy For this embodiment, the distance, which reflects the semantic/lexical relationship between categories, is first measured in an up/down direction, and then, if applicable, in a left/right direction. For example, the semantic/lexical distance from the category "financial investments" to the category "commerce and trade" includes a path through the categories "economics", "business and industry", and "commerce and trade." Thus, for this example, the semantic distance includes a path of three categories.

The semantic/lexical distance in the knowledge catalog is not measured between categories on the same level. For example, the arrangement among the categories "science and technology", "business and economics", and "social environment", all located on the same level of the hierarchy, does not provide any semantic/lexical information. However, categories, arranged in a left/right direction, are counted as a single category in a path that further includes categories in the up/down direction. For example, the semantic/lexical distance between the categories "leisure and recreation" and "colleges and universities" includes a path of the categories "social environment", "science and technology", "formal education" and "colleges and universities" (See FIG. 3). Thus, for this example, the semantic/lexical distance includes a path of four categories. Note that to calculate the path between the categories "leisure and recreation" and "colleges and universities", the path between the "social environment" and "science and technology" categories counts as one category distance such that additional categories in the same level are not counted (e.g. the path does not include "social environment", to "business and economics" and then to "science and technology"). As is described more fully below, the learning system utilizes the semantic/lexical distance information to select a node (e.g. a category) to classify a term.

Figure 3:
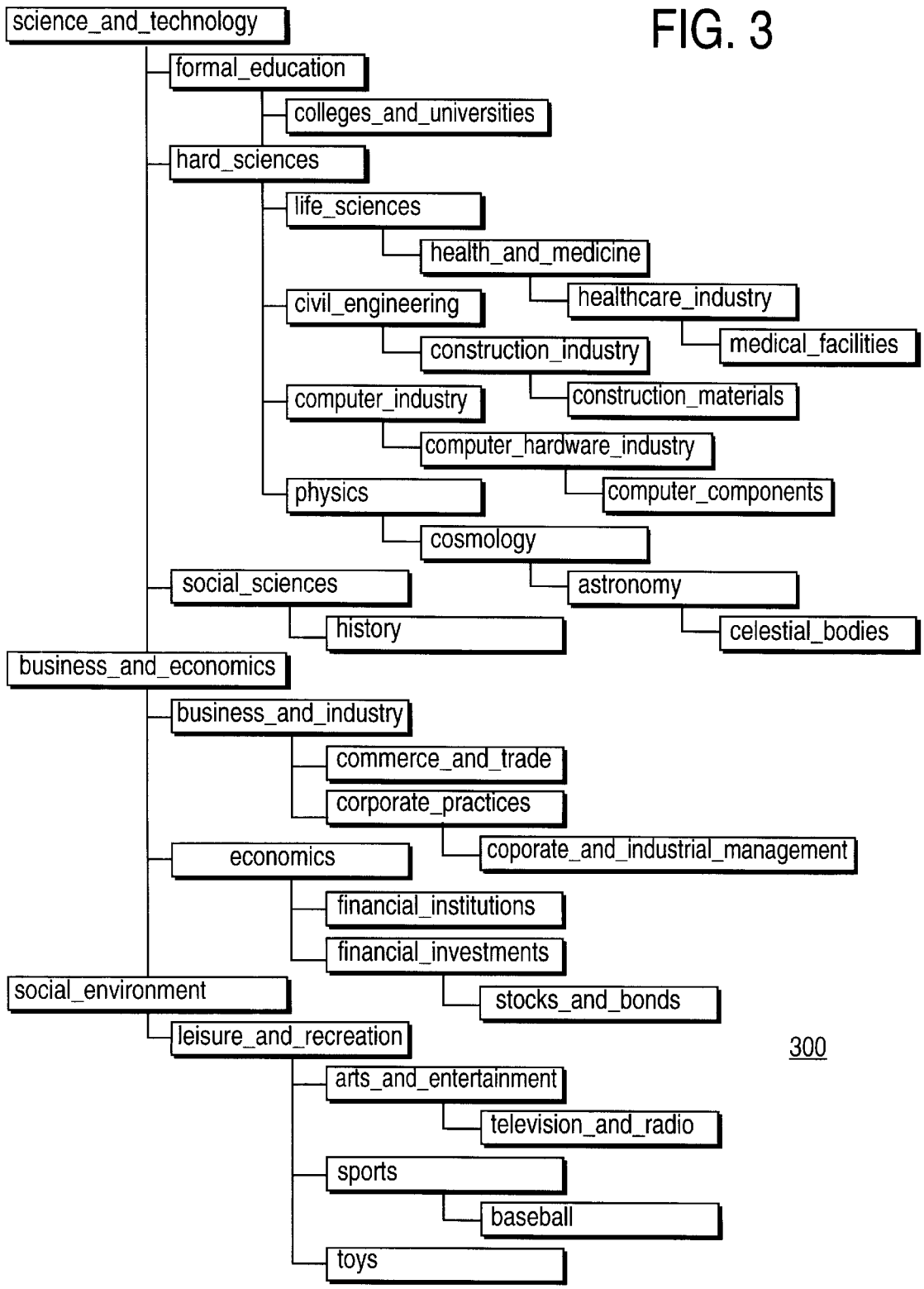
FIG. 3 is an example categorization schema for the phrase "chief operating" and a particular set of documents.

FIG. 3 is an example categorization schema for the phrase "chief operating officer" and a set of documents. The categorization schema 300 shown in FIG. 3 includes portions of a classification hierarchy relevant to the phrase "chief operating officer" (e.g. the categories classified for the chief operating officer phrase). For this example, the categorization schema 300 includes the high level categories "science and technology", "business and economics", and "social environment." Beneath each of the high level categories, several layers of subcategories are shown. The characterization schema 300 further includes shaded categories to indicate classification of at least one document in the corresponding category (e.g. the nodes of the categorization schema are shaded). For each shaded node, the categorization schema 300 includes, next to the box enclosing the category, the number of documents classified for that category For example, the category "colleges and universities" was classified for one document containing the phrase "chief operating officer." Also, the category "corporate and industrial management", located in a branch under the high level category "business and economics", was classified for sixty documents containing the phrase "chief operating officer." A strength for certain nodes, indicated by "S" in FIG. 3, reflects the strength of the classification of the term for the category. The strength is located next to the box enclosing the corresponding category For example, the category "corporate and industrial management" contains a strength of 33435 (S=33435).

The categorization schema 300 also includes cumulative classification strengths shown at various levels of the relevant classification hierarchy. These cumulative classification strengths, labeled CS in FIG. 3, include the total strength of categories and subcategories. The cumulative classification strength is shown next to the box enclosing the corresponding category name. For example, the category "hard sciences", which includes the classified categories "medical facilities", "construction materials", "computer industry", "computer components" and "celestial bodies", has a cumulative classification strength of 3800 (e.g. CS=3800). Also, the category "corporate practices" includes a classification strength of 24310 (CS=24310), which reflects the documents classified for both the "corporate practices" and the child category "corporate and industrial management." In addition to the documents and classification strengths, the categorization schema for a term may also include an assurance calculation, specified as an ambiguity. For example, as shown in FIG. 3, a 32% ambiguity is assigned to the "business and industry" category (e.g. A=32%).

In one embodiment, the learning system processes are operating on the basis of information supplied (e.g. contextual data) from a content processing system about a word or phrase. The contextual data reflects an attempt by the content processing system to correctly categorize, on a document by document basis, a phrase or word based on the content of each document wherein the phrase or word appears. In one embodiment, the contextual data includes the cumulative total number of documents (e.g. document count) classified into a particular category for a term and the cumulative classification strengths associated with each categorization. The learning system utilizes the cumulative total number of documents classified into a particular category for a term, and it also utilizes the cumulative strengths associated with each categorization to select a category. For the embodiment that uses the content processing system described below, the document count and classification strength typically correspond in terms of the importance of the category to the term For example, a high document count for a category typically corresponds to a strong or high classification strength. If the document count and classification strength do not correlate in this manner, then the learning system reduces the level of assurance or increases the ambiguity for the learned term.

In one embodiment, the content processing system generates theme vectors to identify the most important themes of a document The content processing system also generates, from the theme vectors, classification vectors. To classify a term to a category for the accumulation phase of the learning system, the content processing system maps one or more theme vectors to a classification vector such that multiple theme vectors may be collapsed into a classification vector. The content processing system generates the strengths for the corresponding classification vectors.

Figure 4:
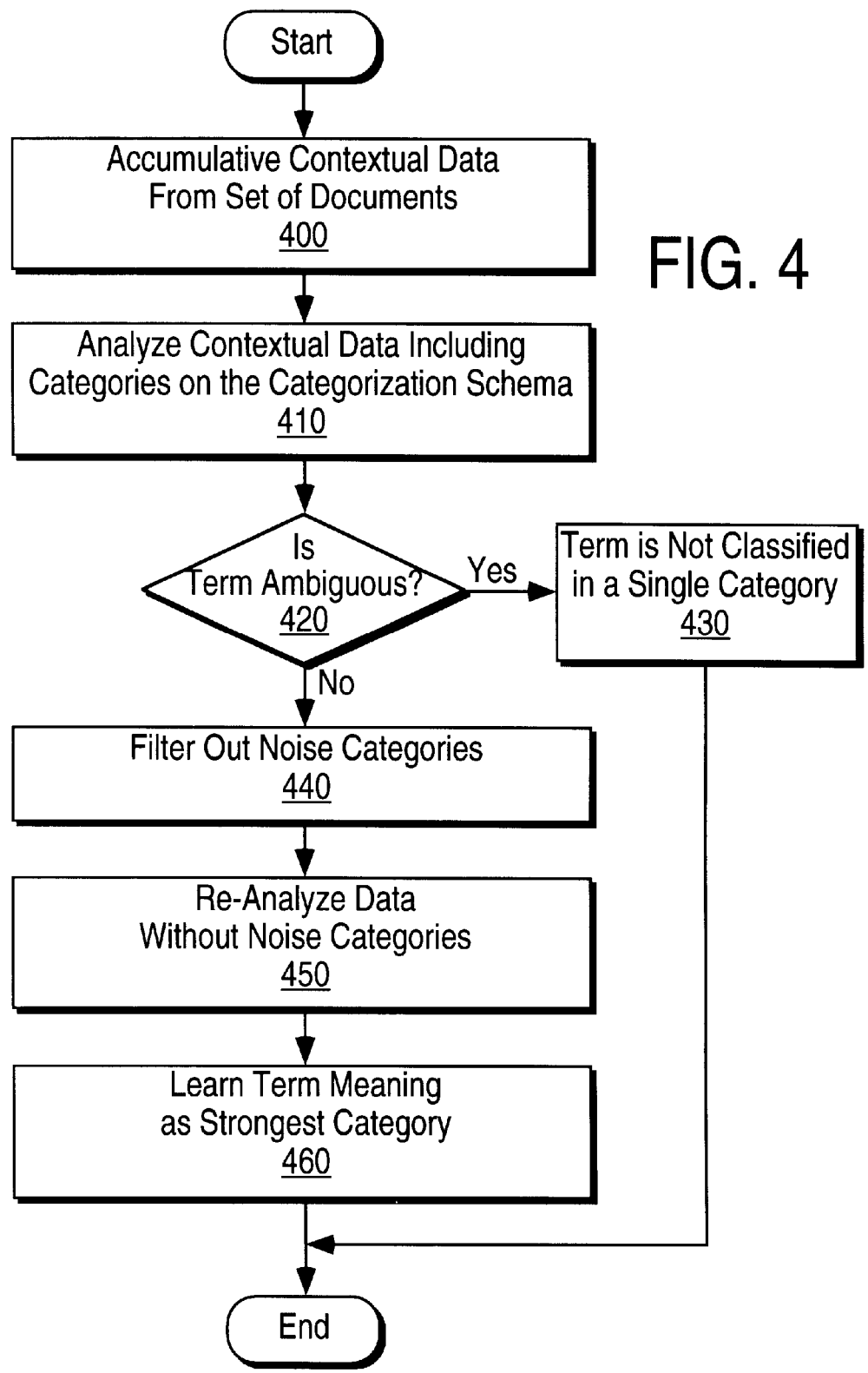
FIG. 4 is a flow diagram illustrating a high level method for learning a term including an accumulation phase and a computational phase in accordance with one embodiment of the present invention.

The Computational Phase:

FIG. 4 is a flow diagram illustrating a high level method for learning a term including an accumulation phase and a computational phase in accordance with one embodiment of the present invention. As shown in block 400, in accordance with the learning system wholeness approach, contextual data is accumulated from a set of documents in the accumulation phase. In one embodiment, for each term a categorization schema is generated. The learning system analyzes the contextual data, including nodes on the categorization schema, to learn the term as shown in block 410.

In one embodiment, the learning system, in the computational phase, analyzes the categorization schema from the bottom sub-categories to the high level categories (e.g. the most detailed categories up to the more general high level categories). For this embodiment, the learning system starts at the bottom of the categorization schema to collect statistics at each level. To analyze the data from the bottom of the categorization schema to the top, the learning system notes the number of documents and their corresponding classification strengths from each node in the categorization schema. A weighted average is calculated and summed at each level of the categorization schema. Thus, at the top level, a cumulative classification strength is assigned to each branch of the categorization schema. The cumulative classification strengths are retained for further analysis.

The computational phase of the learning system also includes determining whether the term is worth learning. In general, a term is worth learning if the term meets certain predetermined criteria. For example, in one embodiment, a certain number of documents must include the term to provide sufficient contextual data to support the wholeness approach. The learning system analyzes the contextual data to determine whether the term is too ambiguous to learn. If the term is too ambiguous to learn, then the term is classified by the learning system into multiple classifications (e.g. an ambiguous term is not classified in a single category) as shown in blocks 420 and 430 on FIG. 4. In general, to determine whether a term is ambiguous, the learning system generates an assurance threshold. The assurance threshold is used to validate the categorization of a term. If a term is below the assurance threshold, then the term is not classified. However, if a term used in a document set is below the assurance threshold, the same term analyzed with more documents in the document set may rise above the assurance level (e.g. the document set now contains enough data to analyze the term). Additional criteria for determining ambiguity of a term is discussed more fully below.

If the term is not ambiguous, then the learning system, utilizing the statistics collected in the bottom to top analysis, filters out noise nodes identified in the categorization schema as shown in blocks 420 and 440. The noise nodes in the categorization schema are nodes that, after analyzing the contextual data, are clearly the incorrect category for the term. The analysis to filter out these noise nodes focuses on determining the categories that the term is not (e.g. nodes with a very weak association to the term). For example, a categorization schema may include a large cluster of nodes all situated on closely related branches (e.g. small semantic/ lexical distance between the branches). The categorization schema may also include a noise node, located in a distant branch, that contains only a single document with a relatively weak classification strength Other nodes may be identified as noise nodes through relative comparison of data in the characterization schema. For example, a node with a mere fifty points of classification strength is noise relative to a node with ten thousand points of classification strength After filtering out the noise nodes, the learning system re-analyzes the characterization schema without the noise nodes as shown in block 450. For this step, the learning system analyzes the remaining nodes (e.g. activated categories) on the characterization schema from top to bottom In general, the learning system attempts to classify the term in the lowest node or category of the characterization schema. As discussed above, the lower the category is in the characterization schema, the more narrow or definite the classification. For example, in the categorization schema shown in FIG. 3, the lower level category "corporate and industrial management" is more specific than the higher level category "business and economics" (e.g. "corporate and industrial management" is a sub-category under the general category of "business and economics"). Based on the learning system principles discussed more fully below, the learning system selects the strongest category or node from the categorization schema to learn the term as shown in block 460.

First, in the top/down re-analysis of the categorization schema, the learning system determines which branch of the categorization schema is the strongest (e.g. includes a combination of the greatest number of documents classified and the strongest classification strengths). After selecting the strongest branch of the remaining nodes in the categorization schema, the learning system analyzes the branch (e.g. proceeds down to the nodes on the branch). In one embodiment, the learning system proceeds, in the top/down re-analysis of the categorization schema, to the next lowest node if the lower node contains the highest strength and the most documents on the branch of the categorization schema. If a lower node contains both more documents and a stronger classification strength, then the term is more specifically about the more detailed or lower level node. Also, if the data is strong in the current level, then the learning system does not push down to a lower level that includes weaker contextual data. If there are two nodes in a lower level, the learning system selects the node with the strongest data (e.g. the highest document count and the strongest classification strengths).

The learning system, when analyzing whether to delve down to a lower level in the characterization schema, may encounter ambiguous data. For example, if the next lower level of the branch includes a first node with fifty documents, a second node with forty five documents, and a third node with forty documents, then delving down to this lower level is ambiguous. Thus, if all of the nodes in the next lower level of the branch are equally weighed, then the learning system does not proceed to the next level of the categorization schema.

The learning system utilizes several principles to associate a term with a category in the categorization schema. For example, the learning system factors in the exclusivity of terms associated with only one category. As discussed above, in one embodiment, the knowledge catalog, the classification structure used to generate the categorization schema, is arranged such that the distance between branches generally correlates to the semantic/lexical relationships of the categories in the respective branches. The learning system analyzes the semantic/lexical distance between the nodes of the categorization schema under consideration. A low semantic/lexical distance between nodes in the categorization schema indicates, if not the specific category best associated with the term, the general area of the categorization schema that best represents the meaning of the term.

The learning system also utilizes, to select a category and to determine accuracy, the amount of contextual data collected beneath the node being analyzed. For the text processing system discussed above, the learning system considers the number of documents used to categorize a term in any of the category nodes beneath the category node being analyzed. Furthermore, the learning system considers the classification strength associated with a node on the categorization schema. The learning system analyzes the categorization schema to determine whether the nodes in the categorization schema are evenly weighed. The distribution of nodes in the categorization schema provide indications of the proper category to learn the term. For example, a collective existence of nodes across a large portion of the categorization schema is an indication that the term is not suited for classification in a specific category.

Figure 5:
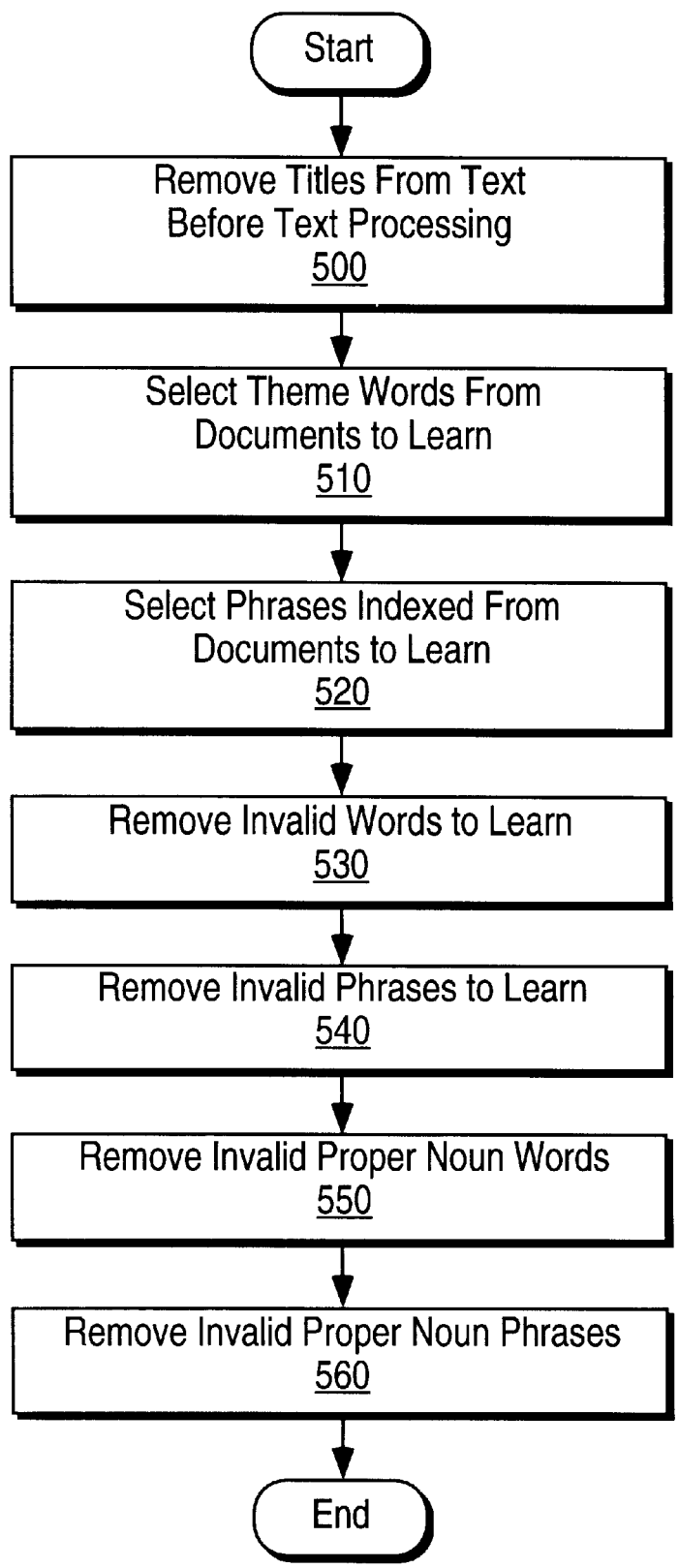
FIG. 5 is a flow diagram illustrating a method for identifying terms to learn in accordance with one embodiment of the learning system.

FIG. 5 is a flow diagram illustrating a method for identifying appropriate terms to learn in accordance with one embodiment of the learning system. As shown in block 500, titles are removed from the text of the documents before text processing. In one embodiment for a content processing system, theme words are generated. For that content processing system embodiment, theme vectors are utilized to identify the theme words. The theme words are selected from the documents for learning as shown in block 510. In addition to the theme words, phrases indexed from the documents are selected for learning as shown in block 520. One embodiment for generating theme vectors and indexes in a content processing system is described more fully below in the section "A Content Processing System."

As shown in block 530, invalid words are removed for learning. Invalid words include: words that are categorized; words that start with a bad character (e.g. $, ", or a digit); a word that is not an orienter; or a word that is in all upper case. As shown in block 540, invalid phrases are removed for learning. Invalid phrases include phrases that are categorized and phrases that start with a bad character. An invalid phrase further includes: a single word that is not hyphenated; a phrase that has more than seven words; any word that is in all upper case; a phrase that has too many commas; a phrase including a capitalized first word and a last word that is not capitalized, or the last word is capitalized and the first word is not capitalized; the phrase begins with "Mr.", "Ms.", or "Mrs." and is more than two words; and all of the words in a phrase are function words. Also, for a phrase, if all the words are weak, then the phrase is removed from learning.

Table 1 outlines a test for the last word in a phrase to determine removal of the phrase from consideration.

TABLE 1

| Word Type | Condition | Connector |
|---|---|---|
| Pronoun | True | OR |
| def_article_det | True | OR |
| ind_article_det | True | OR |
| preposition | True | OR |
| conjunction | True | OR |
| ( intj | True | AND |
| c_noun | False ) | OR |
| aux_modal_verb | True | OR |
| aux_pri_asp_verb | True | OR |
| ( verb | True | AND |
| past participle | False | AND |
| present participle | False | AND |
| c_noun | False | AND |
| adjective | False ) | |

In general, the test of Table 1 determines whether a word is superfluous to the meaning of the phrase (e.g. pronoun, preposition, etc.). If the last word in a phrase passes the test, then the phrase is not learned. To execute this test, the learning system determines the part of speech or word type for the last word in the phrase. For each row in Table 1, if the last word in the phrase is of the word type specified in column one, meets the condition set forth in column two, and the string of conditions between the rows, as indicated by the connector in column three, is met then the word passes the test.

Table 2 outlines a test for the first word of the phrase.

TABLE 2

| Word Type | Condition | Connector |
|---|---|---|
| Pronoun | True | OR |
| def_article_det | True | OR |
| ind_article_det | True | OR |
| preposition | True | OR |
| conjunction | True | OR |
| ( intj | True | AND |
| c_noun | False ) | OR |
| aux_modal verb | True | OR |
| aux_pri_asp_verb | True | OR |
| ( verb | True | AND |
| past participle | False | AND |
| present participle | False | AND |
| c_noun | False | AND |
| adjective | False ) | |

If the first word of the phrase passes the test, then the phrase is removed from consideration. To execute this test, the learning system determines the part of speech or word type for the first word in the phrase. For each row in Table 2, if the first word in the phrase is of the word type specified in column one meets the condition set forth in column two, and the string of conditions linking the rows, as indicated by the connector in column three, is met, then the word passes the test.

As shown in blocks 550 and 560 of FIG. 5, the learning system executes a process to remove invalid proper noun words and phrases, including proper nouns that are not capitalized. Proper noun phrases are invalid if the phrase itself is invalid or if the first and last words are not capitalized. Accordingly, the operations shown in FIG. 5 remove all of the terms not appropriate for learning.

In one embodiment, for these learning system operations, either the entire word or phrase stands or the entire word or phrase is removed from consideration. In addition, individual words are analyzed to determine removal of the word or phrase. Often a phrase removed from consideration for having, for example, a preposition includes another entry in an appropriate form for learning. For example, the phrases "vintage harvest" and "vintage harvest for" may appear on an output as indexes from a content processing system. For this example, the process eliminates the phrase "vintage harvest for", and it retains the phrase "vintage harvest" for learning.

Figure 6:
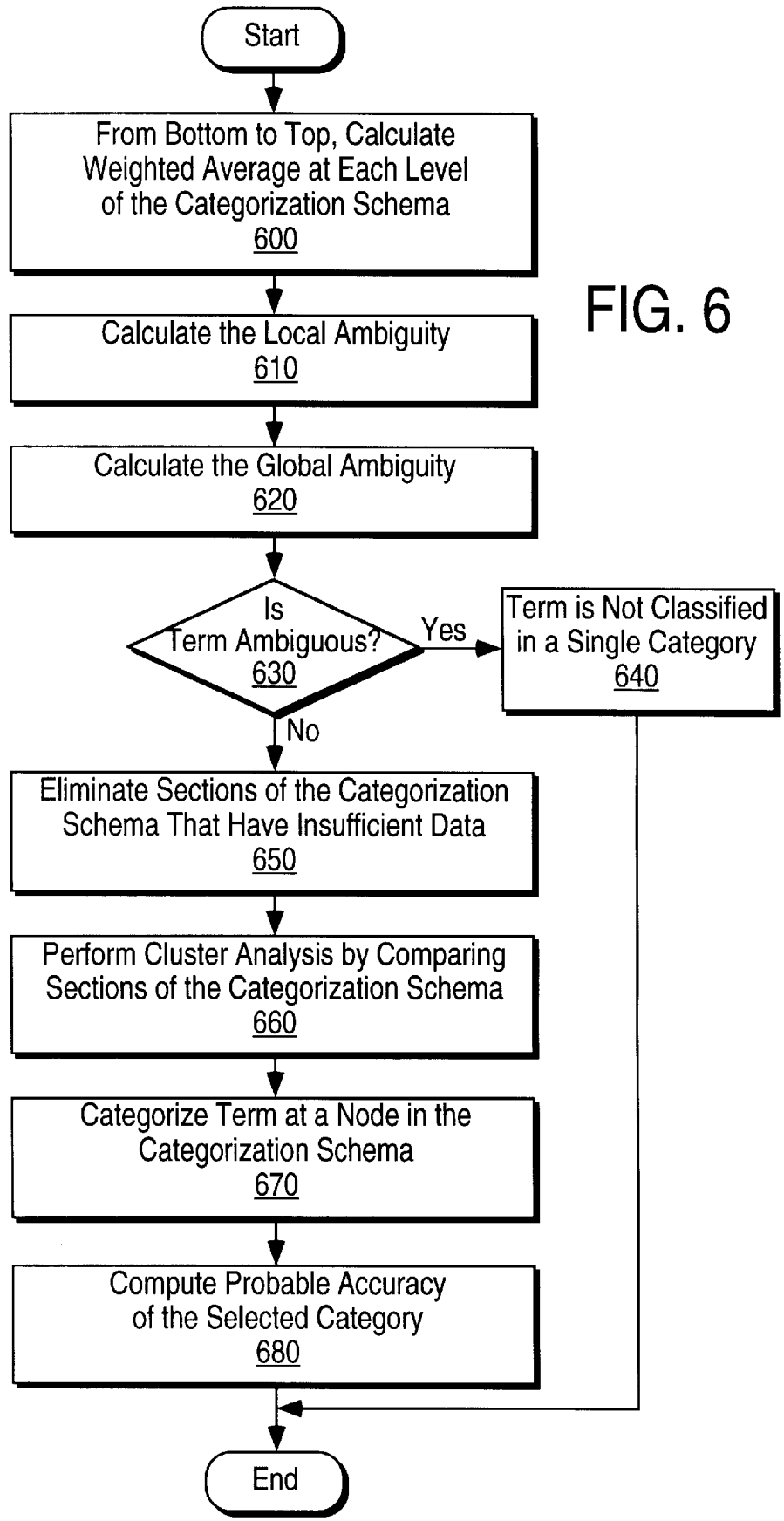
FIG. 6 is a flow diagram illustrating one embodiment of the computational phase for learning a term.

FIG. 6 is a flow diagram illustrating one embodiment of the computational phase used to learn a term. As shown in block 600, the learning system, starting from the bottom node of the categorization schema and proceeding upward, calculates a weighted average at each node of the categorization schema. In one embodiment, the weighted average includes calculating the variables SNUM, LNUM, SUM, and weighted average (WAVG). Specifically, the variable SNUM is equal to the number of documents that the content processing system used to categorize a phrase in any of the nodes beneath the node in question. The variable LNUM is the number of documents classified at the node being analyzed. The variable SUM is calculated as follows:

SUM=(the local strength * NUM)+for each child node (the weighted average of the child * the number of documents of the child).

The weighted average, WAVG, is calculated by the relationship:

WAVG=SUM/(SNUM+LNUM).

For the bottom to top analysis, a weighted average is calculated at each level of the characterization schema in accordance with these parameters.

In one embodiment, the learning system also includes an operation that determines whether a phrase for learning is ambiguous (e.g. the term cannot be categorized uniquely into a single category). To determine whether a term is ambiguous, the learning system calculates both the local and global ambiguities as shown in blocks 610 and 620 of FIG. 6. If there are no child nodes or if there is one child node linked to the node in question, then the local ambiguity is zero. If there is more than one child node linked to the node in question, then the local ambiguity of the node in question is the percent of the accumulated weight of the strongest child node to the sum of the accumulated weights of the other child nodes. In other embodiments, this parameter for calculating local ambiguity may vary to permit tunability of the system.

The global ambiguity of a node in question is computed by adding to the node in question the individual weights of the nodes that are directly above the node in question, the individual weight of the node in question, and the accumulated weight of the child nodes. A percentage is computed between this summed weight and the total weight of all the nodes in the system. If the term is ambiguous, then the term is removed from consideration, and the term is not classified as shown in blocks 630 and 640 on FIG. 6.

In general, ambiguity of a term is measured within a document set. The document set defines the universe of discourse, and the learning is performed within the context of these documents. For example, the term "bank" is generally ambiguous due to several connotations of the term (e.g. a bank as a financial institution, a river bank, or an aircraft maneuver, bank). However, the term "bank" is unambiguous in a universe of discourse that discusses financial institutions (e.g. bank is defined within the context of financial institutions). Similarly, the term "bank" may be unambiguous with a different meaning when analyzed within a universe of discourse of a different document set.

The ambiguity of a term is also measured based on the depth of a node in the categorization schema. For example, a term classified in the first two levels of the classification system (e.g. knowledge catalog) may be characterized as ambiguous. However, a term classified in a fourth level of the classification system may be considered non ambiguous The learning system also considers the number of levels in a branch of a categorization schema to determine ambiguity. For example, classification in the fourth level of a branch that contains twelve levels is more ambiguous than classification in the fourth level of a branch containing only four levels.

For the embodiment shown in the flow diagram of FIG. 6, a third process of the learning system operates on the categorization schema from the top level down. This process eliminates sections of the categorization schema that have insufficient contextual data as shown in block 650 of FIG. 6. In general, the learning system identifies sections of the categorization schema for elimination of consideration because these sections contain an insignificant number of documents relative to the total number of documents, and any assignments to nodes within these sections have insufficient classification strength relative to the total strength. A node is eliminated from consideration if the total number of documents in the node, and any corresponding child nodes, is less than two percent of the total number of documents, and the total classification strength of the node, and any corresponding child nodes, is less than two percent of the total strength of all of the nodes. Thus, the noise nodes in the categorization schema are removed from consideration.

As shown in block 660 of FIG. 6, the learning system performs cluster analysis by comparing various sections of the categorization schema In general, cluster analysis involves determining whether one of the remaining possible sections of the categorization schema is sufficiently stronger than any other section, thereby indicating that the classification should occur somewhere within the stronger section. After selecting a specific cluster, the learning system determines the level of specificity to classify the term (e.g. the level of the hierarchy to select a node within the clusters.) In one embodiment, the classification is assigned in one of the children nodes under a parent node if: the ambiguity of the strongest child node is less than 65%; the strength of the current node is less than three times the weighted sum of the strongest child node; and the number of documents at the current node is less than two times the total number of documents of the strongest child node.

Based on these operations and the principles discussed above, the learning system classifies the term at the appropriate node in the categorization schema as shown in block 670 of FIG. 6. The learning system also computes the probable accuracy of the selected category as shown in block 680. In one embodiment, to compute the probable accuracy of a category, the learning system subtracts the global ambiguity of the node assigned from 100.

The learning system analyzes data to select the best category, if possible, to classify terms. However, categorization errors are possible. Note that when considering possible categorization errors, the categories in the knowledge catalog are not definitions. Instead, the categories refer to areas of interest, and the phrases the learning system categorizes are phrases used to reference those areas of interest in a number of possible ways. Therefore, while one category may be the best category for a phrase, there may be other categorizations plausible for a given document set being analyzed. Also, a user that manually checks the categorization results of the learning system process brings to bear a broader semantic context than what was represented in the document set from which the learning system derived its semantic context. Using this broader semantic context, a user may therefore re-categorize one or more phrases.

A learning system has application for use in document classification. For this application, not all categorization errors are of equal importance. In general, an error is important to the degree that it skews the document classification process. For one type of error, the learning system may not categorize a term in exactly the category a user thinks is the best category. Instead, the learning system may categorize the term in a category very close to the user's choice (e.g. one level up or down the hierarchy, or in some cases, in a different node at the same level of the hierarchy). Typically, this type of categorization error does not have any significant ramification on the document classification process. However, the larger the semantic/lexical distance of the categorization error, the more potential that the error will have on subsequent document classifications.

In one embodiment, the learning system includes a user interface that allows the user to select a number of terms for which the user desires to manually verify. Based on the term selected, the most important terms are presented to the user. For example, the most important terms are the terms that appear in the most documents. In one embodiment, the terms are displayed to the user in the classified category so that the user can easily detect any inconsistencies. For example, a user may detect the improper categorization of a city name displayed in the category "meteorology."

A Learning System Example:

An example categorization schema is shown in FIG. 3. As shown in FIG. 3, the categorization schema, for the term "chief operating officer", includes sub-nodes from the high level categories "science and technology", "business and economics", and "social environment." As discussed above, the categorization schema for this example is generated during the accumulation phase of the learning system. Also, for this example, the learning system determines that the phrase "chief operating officer" is a proper phrase for learning. The cumulative classification strengths, appearing at each level of a branch having a node, is shown in the categorization schema of FIG. 3. The classification strengths are generated from the initial bottom to top analysis of the categorization schema. During the subsequent top to bottom analysis, the learning system, for this example categorization schema, eliminates nodes that contain insufficient data (e.g. noise nodes).

Figure 7:
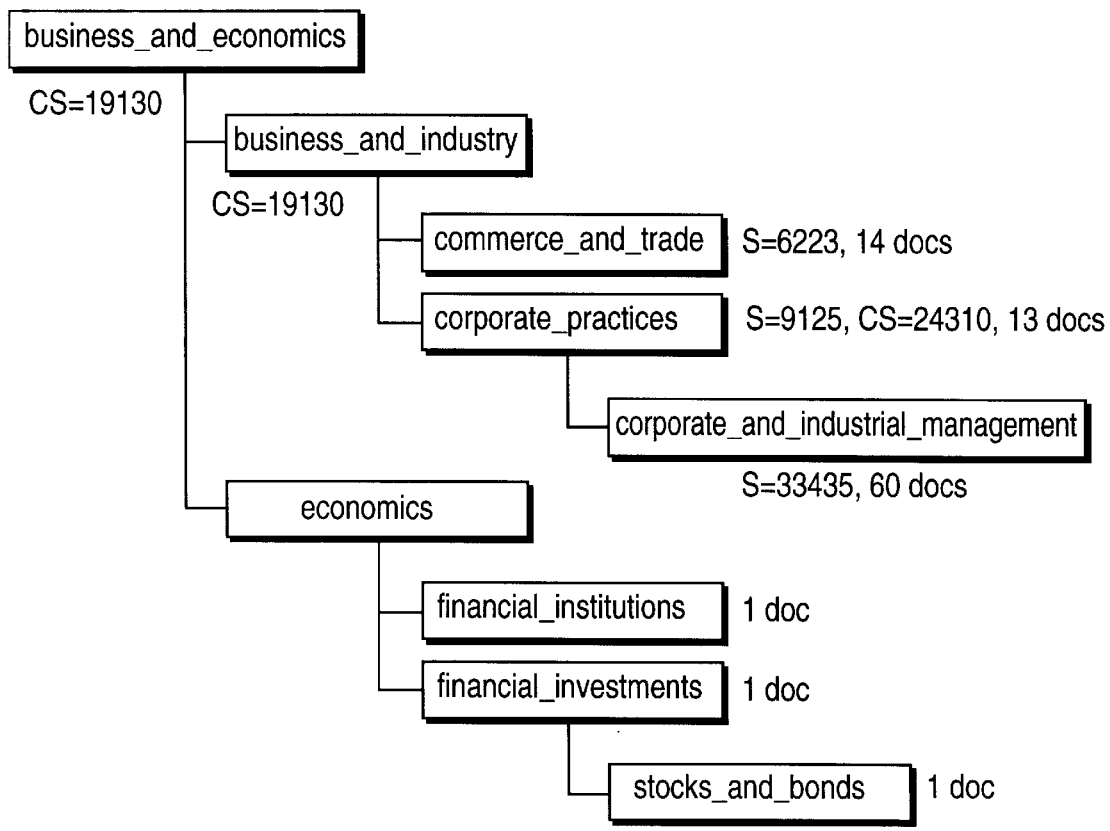
FIG. 7 illustrates a revised categorization schema based on the classification hierarchy shown in FIG. 3.

FIG. 7 illustrates a revised categorization schema based on the categorization schema shown in FIG. 3. As shown by a comparison between FIGS. 3 and 7, the sub-nodes in both the "science and technology" and the asocial environment" categories have been removed. A single document classified in sub-categories of the "science and technology" and "social entertainment" categories are considered noise nodes due to insufficient data to substantiate selection of one of those subcategories. For example, in the "science and technology" category, a single document was classified for each of the subcategories "colleges and universities", "medical facilities", "construction industry", "construction materials", "computer components", "celestial bodies", and "history." These single document classifications are in different branches under the high level category "science and technology." For example, one document was classified under the "formal education" branch and one document was classified under the "hard sciences" branch. Thus, data in both the science and technology as well as the social environment category are considered noise due to the spread out nodes and only a single document associated with each node.

After eliminating the noise categories (FIG. 7), the learning system pushes down, starting from the top, to classify the phrase "chief operating officer", as far down in the categorization schema as accurate. For this example, due to the large cluster of documents classified in the high level category "business and economics", the learning system starts analysis at the "business and economics" category Due to the large amount of documents and corresponding classification strengths in the "business and industry" branch, the learning system proceeds down this branch to push down as far as possible (e.g. classify the phrase in the most detailed sub-node as accurate). As shown in FIG. 7, the "commerce and trade" sub-node includes fourteen documents classified with the classification strength of 6223, and the sub-node "corporate practices" includes thirteen documents classified with a classification strength of 9125. However, the cumulative classification strength at the "corporate practices" subcategory node is 24310. Due to the large number of documents beneath the sub-node "corporate practices", the learning system analyzes the next level node "corporate and industrial management." The "corporate and industrial management" category is the lowest category for this categorization schema. The "corporate and industrial management" category has sixty documents classified and a classification strength of 33435. Thus, based on this data for a categorization schema, the learning system learns the phrase "chief operating officer" as "corporate and industrial management."

Figure 8:
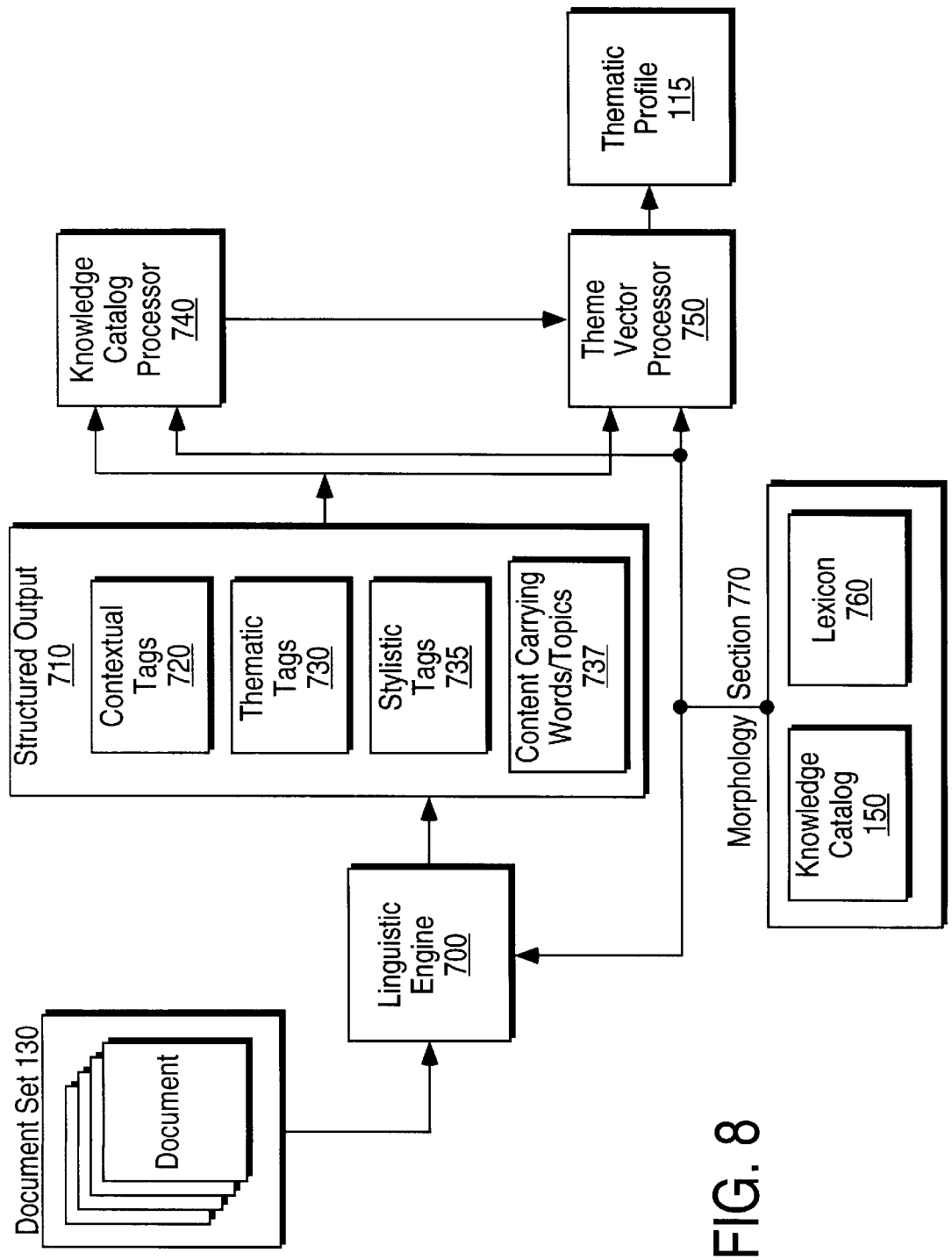
FIG. 8 is a block diagram illustrating one embodiment for a content processing system.

A Content Processing System:

FIG. 8 is a block diagram illustrating one embodiment for a content processing system. In general, the content processing system analyzes the document set 130 and generates the categorization schema for use by the learning system. For this embodiment, the content processing system includes a linguistic engine 700, a knowledge catalog processor 740, a theme vector processor 750, and a morphology section 770. The linguistic engine 700 receives, as input, the document set 130, and generates, as output, the structured output 710. The linguistic engine 700, which includes a grammar parser and a theme parser, processes the document set 130 by analyzing the grammatical or contextual aspects of each document, as well as analyzing the stylistic and thematic attributes of each document. Specifically, the linguistic engine 700 generates, as part of the structured output 710, contextual tags 720, thematic tags 730, and stylistic tags 735 that characterize each document. Furthermore, the linguistic engine extracts topics and content carrying words 737, through use of the thematic tags 730, for each sentence in the documents. For a detailed description of the contextual and thematic tags, see U.S. patent application Ser. No. 08/455,484, inventor Kelly Wical, entitled "Method and Apparatus for Determining Theme for Discourse", filed May 31, 1995, that includes an Appendix D, entitled "Analysis Documentation."

In one embodiment, the linguistic engine 700 generates the contextual tags 720 via a chaos loop processor. All words in a text have varying degrees of importance in the text, some carrying grammatical information, and others carrying the meaning and content of the text. In general, the chaos loop processor identifies, for words and phrases in the documents, grammatical aspects of the documents including identifying the various parts of speech. In order to accomplish this, the chaos loop processor ascertains how the words, clauses and phrases in a sentence relate to each other. By identifying the various parts of speech for words, clauses, and phrases for each sentence in the documents, the context of the documents is defined. The chaos loop process stores information in the form of the contextual tags 720. U.S. patent application Ser. No. 08/455,484, inventor Kelly Wical, entitled "Method and Apparatus for Determining Theme for Discourse", filed May 31, 1995, includes an Appendix C, entitled "Chaos Processor for Text", that contains an explanation for generating contextual or grammatical tags.

A theme parser within the linguistic engine 700 generates the thematic tags 730. Each word carries thematic information that conveys the importance of the meaning and content of the documents. In general, the thematic tags 730 identify thematic content of the document set 130. Each word is discriminated in the text, identifying importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria defines which of the discriminated words are to be selected for each thematic analysis unit. The text is then output in a predetermined thematic format. For a further explanation of a theme parser, see Appendix E, entitled "Theme Parser for Text", of U.S. patent application Ser. No. 08/455,484, inventor Kelly Wical, entitled "Method and Apparatus for Determining Theme for Discourse", filed May 31, 1995.

As shown in FIG. 8, the morphology section 770 contains the knowledge catalog 150 and a lexicon 760. In general, the lexicon 760 stores definitional characteristics for a plurality of words and terms. For example, the lexicon 212 defines whether a particular word is a noun, a verb, an adjective, etc. The linguistic engine 700 uses the definitional characteristics stored in the lexicon 760 to generate the contextual tags 720, thematic tags 730, and the stylistic tags 735. An example lexicon, for use with a content processing system, is described in Appendix B, entitled "Lexicon Documentation", of U.S. patent application Ser. No. 08/455,484, inventor Kelly Wical, entitled "Method and Apparatus for Determining Theme for Discourse", filed May 31, 1995.

The topics and content carrying words 737 are input to the knowledge catalog processor 740. In part, the knowledge catalog processor 740 processes the content carrying words for direct use with the knowledge catalog 150. Specifically, the knowledge catalog processor 740 generates, as appropriate, the nominal or noun form of each content carrying word, as well as the count sense and mass sense of the word. Furthermore, the knowledge catalog processor 740 determines, from the knowledge catalog 150, which content carrying words are non ambiguous.

As shown in FIG. 8, the theme vector processor 750 receives the thematic tags 730 and contextual tags 720 from the structured output 710. In addition, the non ambiguous content carrying words from the knowledge catalog processor 740 are input to the theme vector processor 750. The content carrying words may include single words or phrases. The content carrying words output from the knowledge catalog processor 740 are converted to the noun or nominal form. In general, the theme vector processor 750 presents a thematic profile of the content of each document (e.g. generates the thematic profile 115). To accomplish this, the theme vector processor 750 determines the relative importance of the non ambiguous content carrying words in the document set. In one embodiment, the theme vector processor 750 generates a list of theme terms, including words and phrases, and assigns a relative theme strength to each theme term. The theme vector processor 750, through use of the knowledge catalog 150, generates a theme concept for each theme term by mapping the theme terms to categories in the knowledge catalog. Thus, the theme concepts indicate a general topic or category in the knowledge catalog to identify the content of each document. In addition, the theme vector processor 750 generates, for each theme term, an importance number, a theme strength, and an overall capacity weight of collective content importance.

The theme vector processor 750 identifies index phrases including index heads and index context entries that relate to the index heads. The index phrases may be selected for learning in the learning system of the present invention. The index heads are content carrying words from the documents but the words are not pre-defined knowledge catalog categories. For example, the term "OS/2", which defines a specific operating system, is a content carrying noun. However, in one embodiment of a knowledge catalog, "OS/2" may not be a specific category. If the documents 130 include material on "OS/2", then "OS/2" is stored as an index head. The index context entries are index phrases that are used within the context of an index head. For the OS/2 example above, if a document contained information on the marketing of the OS/2 operating system, then "marketing" is stored as an index context entry for the index head "OS/2." Note that marketing may also be stored as an index head. Index heads are dynamically classified in a hierarchical structure, and that classification is stored with the index head.

The thematic profile 115 includes records that provide information about the content of the document set 130. In general, the thematic profile 115 identifies relationships among the term for learning and other terms (e.g. relationships among an index heads, index context entries, and themes). In one embodiment, the thematic profile 115 includes, in part, theme records, a document table, a topic table, a document/topic table, an index table, and an index/topic table. The theme records contain thematic information including the identification of the most important themes from each document. The document table contains information about the set of documents 130 including document level theme and statistical information. The topic table includes a hierarchy of topics or categories for the entire set of documents 130. Specifically, the topics, stored in the topic table, are based on themes extracted from the documents 130. The extracted themes or topics are then mapped to categories in the knowledge catalog to generate the topic table. The document/topic table contains a cross reference between the documents 130 and the topics stored in the topic table.

The index table contains index information from the documents 130, including the text and location of the index phrases. If the index context entry is not an index head, then the index table contains the parent or index head for the index context entry. The index/topic table contains cross references between indexes, stored in the index table, and the topics or categories stored in the topic table. For example, in one document, the index head "OS/2" may be mapped to the category "operating systems." For this example, the index/topic table and the categorization schema reflect, for that document, the use of the term "OS/2"

to connote an operating system. Therefore, the index/topic table provides a link between the index phrases and the categories in the knowledge catalog, to define a categorization schema for the index phrases. A further explanation of generating a thematic profile is contained in U.S. patent application Ser. No. 08/455,484, inventor Kelly Wical, entitled "Method and Apparatus for Determining Theme for Discourse", filed May 31, 1995, which is herein incorporated by reference.

For this embodiment of a content processing system, the learning system, during the accumulation phase, generates the categorization schema for a term through use of the thematic profile 115. For example, if the term sought to be learned is an index phrase, then the learning system uses the index/topic table to identify the nodes in the knowledge catalog classified for that term. For example, if the index/topic table reflects that 10 documents in the document set have been classified for the term "OS/2" in the category "operating systems", then the categorization schema for the term "OS/2" reflects that 10 documents have been classified for the operating system category. Also, the learning system utilizes the thematic profile 115 to add theme strength information to the nodes categorized for the term.

Figure 9:
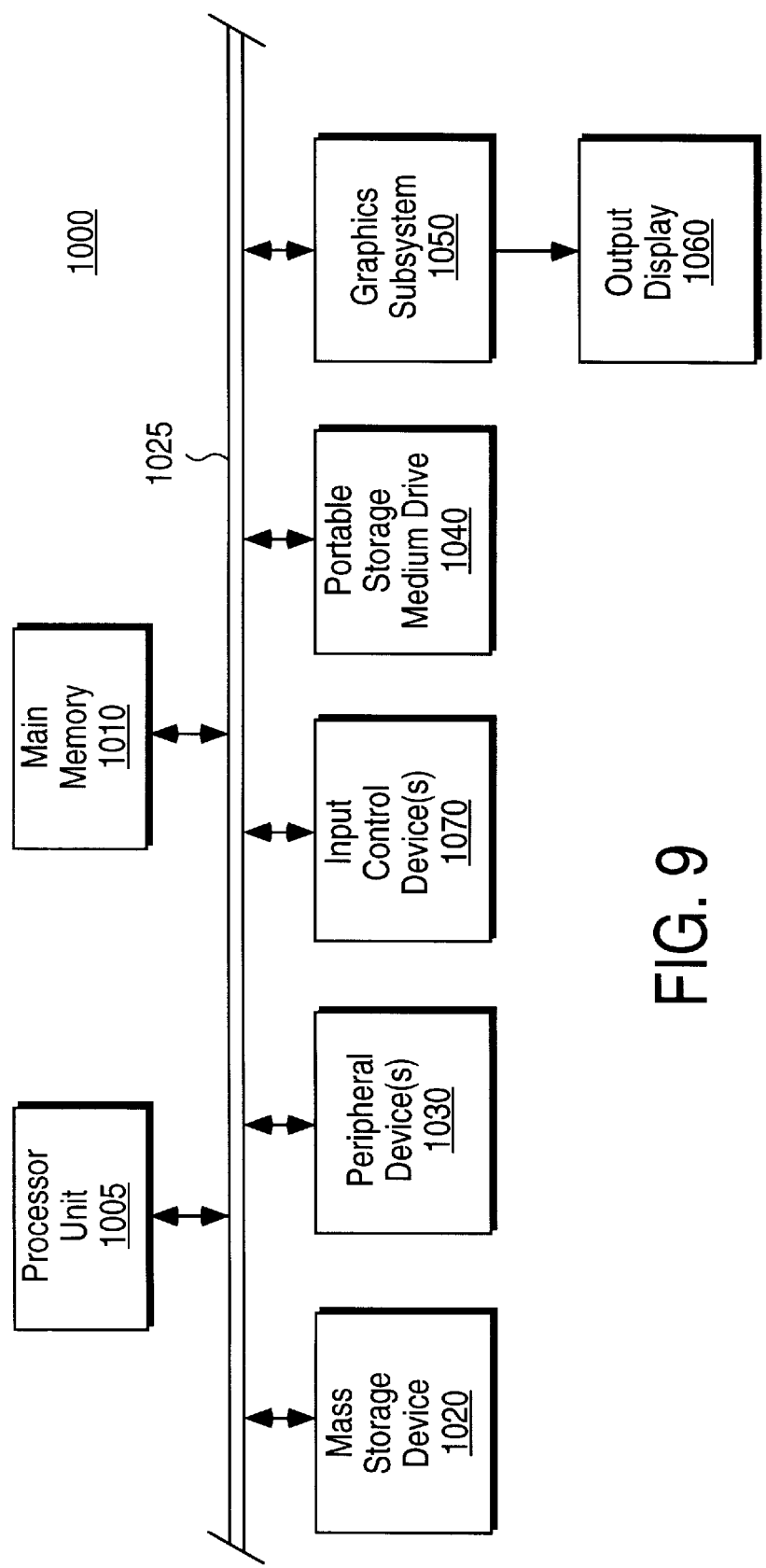
FIG. 9 illustrates a high level block diagram of a general purpose computer system in which the learning system of the present invention may be implemented.

Computer System:

FIG. 9 illustrates a high level block diagram of a general purpose computer system in which the learning system of the present invention may be implemented. A computer system 1000 contains a processor unit 1005, main memory 1010, and an interconnect bus 1025 The processor unit 1005 may contain a single microprocessor, or may contain a plurality of microprocessors for configuring the computer system 1000 as a multi-processor system. The main memory 1010 stores, in part, instructions and data for execution by the processor unit 1005. If the learning system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 9 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the learning system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the learning software is stored on such a portable medium, and it is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the documents or list of terms may be input to the computer system 1000 via a portable storage medium or a network for processing by the learning system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and it processes the information for output to the output display 1060. The components contained in the computer system 1000 are those typically found in general purpose computer systems, and in fact, these components are intended to represent a broad category of such computer components that are well known in the art.

The learning system may be implemented in either hardware or software. For the software implementation, the learning system is software that includes a plurality of computer executable instructions for implementation on a general purpose computer system. Prior to loading into a general purpose computer system, the learning system software may reside as encoded information on a computer readable medium, such as a magnetic floppy disk, magnetic tape, or compact disc read only memory (CD-ROM). In one hardware implementation, the learning system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for automated learning of terminology from an input set of documents, the method comprising the steps of:

storing a classification system comprising a plurality of categories of terminology arranged to reflect associations among related categories;

processing the input set of documents to classify each of the documents into a category of the classification system, wherein the documents classified contain a term for learning;

generating contextual data for the term for learning by mapping the categories selected to the classification system so as reflect associations among the categories selected;

analyzing the contextual data, including analyzing all of the categories selected in the classification system for the term, prior to selecting a single category for the term; and selecting a single category, based on the associations of the categories in the classification system, for the term to learn the term as the single category.

2. The method as set forth in claim 1, wherein the step of analyzing the contextual data comprises the steps of:

determining whether the term is ambiguous such that the contextual data for the term does not indicate selection of a single category; and removing the term from consideration for learning if the term is ambiguous.

3. A method for automated learning of at least one term from an input set of documents, the method comprising the steps of:

storing a classification system comprising a plurality of categories of terminology arranged in a hierarchy of categories so as to reflect associations among related categories;

processing the input set of documents to generate contextual data by classifying the term in a plurality of categories of the classification system; and analyzing the contextual data by performing hierarchical clustering analysis on the selected categories of the hierarchy of categories in the classification system to identify a cluster of categories and to select a single category in the cluster from the plurality of selected categories to learn the term as the single category selected.

4. The method as set forth in claim 3, wherein:

the step of processing the input set of documents to generate contextual data comprises the step of generating a categorization schema from said classification system comprising a plurality of nodes, arranged in a plurality of levels of the hierarchy and logically coupled by at least one branch, and data associated with each node, wherein the nodes identify the categories classified; and the step of analyzing the contextual data comprises the step of analyzing the categorization schema, including the data, to select a node in the categorization schema to classify the term.

5. The method as set forth in claim 4, wherein the step of analyzing the categorization schema comprises the steps of:

analyzing nodes, including the data, from the top of at least one branch of the categorization schema to nodes further down on the branch so as to determine classification of the term in a node on the branch; and selecting a node as far down on the branch in the categorization schema to classify the term as supported by the data.

6. The method as set forth in claim 4, wherein the step of analyzing the categorization schema comprises the steps of:

accumulating the data at each node of the categorization schema;

generating a weighted average at each node of the categorization schema based on the data; and utilizing the weighted average at each node to select a node in the categorization schema to classify the term.

7. The method as set forth in claim 4, wherein the step of analyzing the categorization schema comprises the steps of:

selecting a branch in the categorization schema that includes a cluster of nodes; and analyzing the branch, starting from the top of the branch, to select a node supported by the data.

8. The method as set forth in claim 4, wherein the step of analyzing the categorization schema comprises the step of eliminating from consideration nodes in the categorization schema that include insufficient data to support classification of a term into a node.

9. The method as set forth in claim 4, wherein the data associated with each node specifies a number of documents classified to each node and a classification strength associating the node with the term.

10. The method as set forth in claim 9, wherein the step of analyzing the categorization schema comprises the step of analyzing the classification strength associating the term with the node being analyzed.

11. The method as set forth in claim 3, wherein the step of storing a classification system comprises the step of storing the classification system such that associated categories are distanced to reflect a semantic and lexical relationship between respective categories.

12. The method as set forth in claim 4, wherein the step of analyzing the categorization schema comprises the steps of analyzing the nodes of the categorization schema to identify clusters and eliminating nodes from consideration if the nodes are located outside the cluster.

13. The method as set forth in claim 3, wherein the step of analyzing the contextual data comprises the steps of:

determining whether the term is ambiguous such that the contextual data for the term does not indicate classification in a single category; and removing the term from consideration for learning if the term is ambiguous.

14. The method as set forth in claim 3, further comprising the step of removing inappropriate terms from consideration from learning.

15. A computer readable medium having a set of instructions stored therein, which when executed by a computer, causes the computer to perform the steps of:

storing a classification system comprising a plurality of categories of terminology arranged in a hierarchy of categories so as to reflect associations among related categories;

processing the input set of documents to generate contextual data by classifying the term in a plurality of categories of the classification system; and analyzing the contextual data by performing hierarchical clustering analysis on the selected categories of the hierarchy of categories in the classification system to identify a cluster of categories and to select a single category in the cluster from the plurality of selected categories to learn the term as the single category selected.

16. The computer readable medium as set forth in claim 15, wherein:

the instructions for processing the input set of documents to generate contextual data comprises instructions for generating a categorization schema from said classification system comprising a plurality of nodes, arranged in a plurality of levels of the hierarchy and logically coupled by at least one branch, and data associated with each node, wherein the nodes identify the categories classified; and the instructions for analyzing the contextual data comprises instructions for analyzing the categorization schema, including the data, to select a node in the categorization schema to classify the term.

17. The computer readable medium as set forth in claim 16, wherein the instructions for analyzing the categorization schema comprises instructions for:

analyzing nodes, including the data, from the top of at least one branch of the categorization schema to nodes further down on the branch so as to determine classification of the term in a node on the branch; and selecting a node as far down on the branch in the categorization schema to classify the term as supported by the data.

18. The computer readable medium as set forth in claim 16, wherein instructions for analyzing the categorization schema comprises instructions for:
   accumulating the data at each node of the categorization schema;
   generating a weighted average at each node of the categorization schema based on the data; and
   utilizing the weighted average at each node to select a node in the categorization schema to classify the term.

19. The computer readable medium as set forth in claim 16, wherein instructions for analyzing the categorization schema comprises instructions for:
   selecting a branch in the categorization schema that includes a cluster of nodes; and
   analyzing the branch, starting from the top of the branch, to select a node supported by the data.

20. The computer readable medium as set forth in claim 16, wherein the instructions for analyzing the categorization schema comprises instructions for eliminating from consideration nodes in the categorization schema that include insufficient data to support classification of a term into a node.

21. The computer readable medium as set forth in claim 16, wherein the data associated with each node specifies a number of documents classified to each node and a classification strength associating the node with the term.

22. The computer readable medium as set forth in claim 21, wherein the instructions for analyzing the categorization schema comprises instructions for analyzing the classification strength associating the term with the node being analyzed.

23. The computer readable medium as set forth in claim 16, wherein instructions for storing a classification system comprises instructions for storing the classification system such that associated categories are distanced to reflect a semantic and lexical relationship between respective categories.

24. The computer readable medium as set forth in claim 16, wherein the instructions for analyzing the categorization schema comprises instructions for analyzing the nodes of the categorization schema to identify clusters and eliminating nodes from consideration if the nodes are located outside the cluster.

25. The computer readable medium as set forth in claim 15, wherein the instructions for analyzing the contextual data comprises instructions for:
   determining whether the term is ambiguous such that the contextual data for the term does not indicate classification in a single category; and
   removing the term from consideration for learning if the term is ambiguous.

26. The computer readable medium as set forth in claim 15, further comprising instructions for removing inappropriate terms from consideration from learning.

27. A text processing system for learning at least one term in an input set of documents comprising:
   a classification system comprising a plurality of categories of terminology arranged to reflect associations among the categories;
   a content processing system for processing the input set of documents to generate a thematic profile for each document that identifies a category for classification of the documents that include the term for learning; and
   a learning system coupled to receive the thematic profile and categories of the classification system for generating a categorization schema by classifying the term into a plurality of different categories in the classification system, and for analyzing the categorization schema to select a single category from the plurality of different categories in the classification system to learn the term as the single category selected.

28. A computer readable medium having a set of instructions stored therein, which when executed by a computer, causes the computer to perform the steps of:
   storing a classification system comprising a plurality of categories of terminology arranged to reflect associations among the categories;
   processing the input set of documents to select a plurality of categories for a plurality of documents, one category for each document, to classify the documents, wherein the documents classified include a term for learning;
   generating contextual data for the term for learning by mapping the categories selected to the classification system so as reflect associations among said category selected;
   analyzing the contextual data, including analyzing all of the categories selected in the classification system for the term, prior to selecting a single category for the term; and
   selecting a single category from the plurality of categories in the contextual data for the term to learn the term as the single category.

* * * * *